Figure 1:
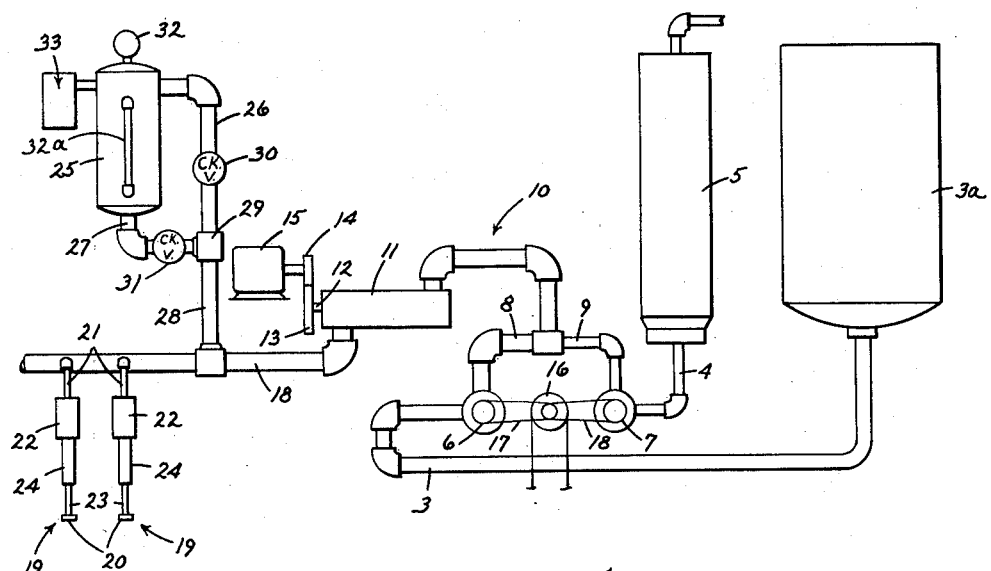

Aug. 6, 1957     E. K. BAUER     2,801,440

EXTRUSION APPARATUS

Filed May 8, 1953 ered Aug. 6, 1957

2,801,440
EXTRUSION APPARATUS

Ernest K. Bauer, Meadville, Pa., assignor to American Viscose Corporation, Philadelphia, Pa., a corporation of Delaware Application May 8, 1953, Serial No. 353,760

4 Claims. (Cl. 18—8)

This invention relates to a system for supplying a film-forming or filament-forming plastic mass to a plurality of forming positions where it is to be extruded to form films, filaments, rods or other shaped products. It is particularly concerned with a system adapted to inject an auxiliary material into a stream of a primary or main filament-forming or film-forming plastic mass.

The system of the present invention is adapted to combine two flowing streams of material into a common stream which is directed to a plurality of forming stations. The main or primary material may comprise a filament-forming mass in the form of a molten material, a solution in a volatile or non-volatile solvent, or a dispersion in a volatile or non-volatile medium. The auxiliary or secondary material which is to be added to the main or primary material may comprise any substance that is intended to serve as a colorant, such as a pigment or dye, or as a delustrant, such as an inorganic insoluble substance such as titanium dioxide, or as a plasticizer or softener for the film-forming substance of the main stream or as a lubricant such as an oil, soapy or waxy substance, or as an anti-static agent or other conditioning agent for the purpose of modifying the characteristics of the films, filaments, or other shaped articles formed from the mixture. The auxiliary stream may consist of such substances in a molten condition or it may comprise solutions or dispersions of such substances in a volatile or non-volatile medium or in a fluid medium which also comprises a film-forming or filament-forming substance which may be the same as or different from the substance in the main stream.

It is the primary object of the present invention to provide a system which is adapted to mix and feed the mixture of two or more substances or compositions having in the mixture any desired predetermined constant ratio therebetween into the common discharge stream which is directed to the forming stations. It is a further object of the present invention to provide a system adapted to supply the common stream containing the predetermined proportions of the primary and secondary materials to one or more of the plurality of forming stations while providing for a variable accumulation of the mixed materials when less than the complete number of forming stations is in operation, which may occur during the starting or stopping of the forming operation or during forming as the result of clogging of some of the extrusion devices in the forming stations.

Other objects and advantages of the invention will be apparent from the drawing and description thereof hereinafter.

Figure 2:
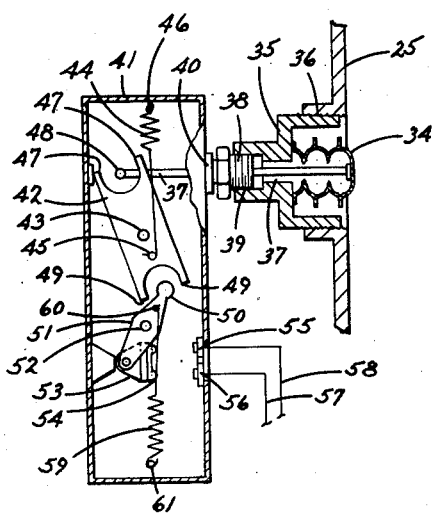

In the drawing, which is illustrative of the invention,

Figure 1 is a schematic elevation of a preferred embodiment of the present invention, and Figure 2 is an enlarged view showing one form that the switch means 33 may take.

As shown, a conduit 3 is connected to a main supply container, such as a tank 3a, of the primary or main material of film-forming or filament-forming character. A conduit 4 is connected to a supply container, such as a tank 5, of an auxiliary material which may comprise any of the secondary substances mentioned hereinabove, such as a pigment, and as stated above, the pigment may be dispersed in some of the same film-forming or filament-forming material as that in the main supply fed through conduit 3.

A pump 6 and a pump 7 of the positive displacement type (such as gear pumps) are connected to the conduits 3 and 4 respectively and discharge through branch conduits 8 and 9 respectively into a common conduit 10 which is connected to a mixing or blending device 11. The device 11 may be provided with internal agitating means operated by a shaft 12, gears 13 and 14 and a motor 15. A motor 16 is operatively connected such as by chains 17 and 18 respectively to drive the pumps 6 and 7 respectively. During operation of the pumps 6 and 7, their speeds are maintained constant so as to maintain a constant ratio between the amounts of primary and secondary streams discharged through pipes 8 and 9 respectively into the common pipe 10. Of course, the ratio between the two materials may be changed as desired by changing the speed ratios between the motor 16 and the pumps 6 and 7 respectively and if desired, a suitable variable speed transmission or reduction gear may be provided in the driving connections between the motor 16 and either or both of the pumps 6 and 7.

From the mixer 11, a discharge line 18 serves to conduct the blended mixture of the primary and secondary materials to a plurality of forming stations 19 which may comprise any suitable forming device for producing films, filaments, rods, tubes or the like but, as specifically shown, such stations comprise filament-forming spinnerets 20. The forming devices 20 are individually connected to the header 18 by branch pipes 21 and individual metering pumps 22 which discharge through conduits 23 in which a filtering device 24 may or may not be provided as desired. The pumps 22 may advantageously be gear pumps so as to supply the forming material to the forming devices 20 at a constant speed. In this manner, if the forming devices are spinnerets, the filaments produced all have the same denier regardless of which forming device produced the individual filaments.

The system comprises means for preventing the pressure in the header 18 from becoming excessively high in cases where all of the forming devices and the pumps 22 supplying them are not operating. This condition may occur during starting of the system when and if the operator starts the pumps 22 individually one after the other. Also, during operation, one or more of the forming stations may become stopped-up or clogged in which event also less than the normal full consumption of forming material supplied in header 18 can be used up. Since the pumps 6 and 7 must be operated at sufficient speed to supply all of the forming stations, means must be provided for taking care of the excess material supplied to header 18 when all of the forming stations are not in operation. This means comprises an accumulator or storage tank 25 providing a storage chamber with a gas space or pressure dome at the top connected by an inlet conduit 26 to the conduit means for conveying the combined stream of primary and secondary materials to the forming stations. This connection may be made before or after the combined stream reaches the blender 11, that is either to the pipe 10 or, as shown, to header 18. A discharge or outlet pipe 27 is connected to the bottom of tank 25 and also to the header 18. Pipes 26 and 27 may be connected separately to header 18 but as shown, they are connected to a common branch pipe 28 through a T 29. Each of pipes 26 and 27 are provided with check valves 30 and 31 respectively permitting the fluid to flow in one direction only, valve 30 allowing flow through 26 into the tank 25 and valve 31 allowing flow through the pipe 27 out of the tank 25.

A pressure gauge 32 may be provided for communication with the gas space in tank 25. A sight gage glass 32a may also be provided so that the liquid level in the vessel 25 can be observed at all times. The gas space is preferably occupied by a gas that is insoluble in the solution of film-forming material in the range of pressures to be used in the storage tank. Air may be used most advantageously whenever the forming material is of a character such that it does not substantially dissolve the air. Other gases such as nitrogen, carbon dioxide, helium, or methane may be used. When the gas used is somewhat soluble in the spinning solution, the sight gage glass permits observation of the liquid level in storage vessel 25 so that an operator by observing the pressure on gage 32 and the level in the vessel 25 can introduce additional gas whenever it is necessary. Alternatively, in case a gas is used that is soluble in the solution of forming material, a blanketing layer of a liquid that does not dissolve the gas and which is immiscible with and of a lower specific gravity than the forming solution may be introduced on top of the forming solution in vessel 25. In this latter event, pipe 26 is preferably connected to tank 25 just below the minimum liquid level therein. Instead of a blanketing liquid, a flexible diaphragm, such as of neoprene, may be fixed in tank 25 and divide it into non-communicating upper and lower compartments. In this case, also, pipe 26 should be connected to tank 25 just below the diaphragm.

There may also be provided means for stopping the motor 16 when the pressure in tank 25 exceeds a predetermined amount or whenever the level of the contents within tank 25 exceeds a predetermined height. Similarly, means may be provided for starting motor 16 when the pressure in tank 25 decreases to a predetermined amount or when the level in the tank 25 is lowered to a predetermined height. For this purpose, the wall of tank 25 may be made of transparent material or it may be provided with a sight glass, such as that used to show the water level in boilers, so that the operator can turn off the motor 16 when the level reaches a particular upper level and turn on such motor when the level descends to a particular lower level. Preferably, however, the electric circuit to the motor 16 may be provided with switch means controlled by probes or detector elements disposed at different predetermined levels in the tank 25 for opening and closing the circuit to the motor 16 when the liquid level therein rises to the higher level or falls to the lower level respectively. Specifically, there is shown in the drawing, a pressure-operated switch means 33. This means comprises any suitable type of pressure responsive means extending into or disposed in the air space in tank 25. The switch means 33 may be of any conventional form and is connected in the circuit to the motor 16 so as to interrupt operation of the motor when the pressure exceeds a given amount and the switch means 33 also comprises a switch element which is operated in conventional fashion when the pressure within the tank 25 decreases below a predetermined amount so as to start the motor 16.

One specific form of switch means 33 shown in Figure 2 comprises a pressure-sensitive diaphragm or bellows 34 having one end sealed to the inside of a plug 35 fitting within a screwed aperture 36 within the wall of the vessel 25. A rod 37 extends through a guide plug 38 fitted within a thread-opening 39 in the plug 35 and the clearance between the rod 37 and the plug 38 may be provided with a packing held in place by a packing gland 40. A snap switch housing 41 may be secured in fixed position relative to the tank 25 such as to the packing gland 40 and within the housing 41 there is disposed a lever 42 pivotally mounted at 43. A spring 44 connected to the pin 45 on the switch lever and to a fixed pin 46 projecting from a wall of the housing 41 provides a toggle action. The lever 42 is bifurcate at each end and has at one end two prongs 47 between which a laterally projecting knob 48 on the rod 37 moves back and forth. The spaced prongs 49 at the other end of lever 42 are adapted to engage one end 50 of a lever 51 pivoted at 52. The other end of lever 51 carries pivotally mounted thereon a shoe 53 carrying a switch plate 54 adapted to engage contacts 55 and 56 which are connected to lines 57 and 58 respectively of the circuit to motor 16. A spring 59 is connected to pin 60 on lever 51 and to pin 61 fixed to a wall of the housing 41. Spring 44 is sufficiently stronger than spring 59 to overpower the latter when pin 45 is swung past and through alignment with pin 46 and pivot 43. The connection of spring 59 to lever 51 and the housing 41 is also such as to provide toggle action. This assures quick action for both opening and closing the switch. In the solid line position shown in Figure 2, the circuit to the motor 16 is open, the wsitch being in the position to which it is thrown by high pressure upon the bellows 34. When the pressure decreases upon the bellows 34, the bellows expands and moves the rod 37 to the right acting upon the right hand leg or arm 47 of the lever until the pin 45 passes under the pivotal point 43 at which time the spring 44 swings the switch lever in a clockwise direction, swings lever 51 in a counterclockwise direction, and closes the circuit thereby starting the motor 16.

The motor 15 need not be in the same circuit as motor 16 but preferably it is in the same circuit so that it is simultaneously stopped and started by the switch means 33 when motor 16 is stopped and started respectively.

When an operator starts up the system, the motors 15 and 16 are started and he then proceeds to start the pumps 22 one at a time at each of the forming stations, directing the formed products to the proper collecting or conveying device. During this starting operation as he proceeds from one forming station to another, there being as many as ten to one hundred or more such forming stations in many applications, the excess of the mixed material supplied to header 18 flows into the accumulator tank 25 and depending upon the rapidity with which the operator starts the several forming stations, the pressure within the tank 25 may or may not exceed the limit which causes operation of the switch means 33 and stopping of the motor 16 and also 15 if in the same circuit. If the pressure exceeds the limit, the switch means 33 stops the motor 16 or both motors 15 and 16 and the pressure within tank 25 serves to continue the feed of the material stored within the tank through the check valve 31 and header 18 to the forming stations. When the pressure 25 is sufficiently relieved as a result of the consumption of the material stored therein, switch means 33 starts operation of the motor 16 or of both motors 15 and 16.

The check valves 30 and 31 are important to prevent stagnation of portions of the material supplied to the tank 25. Because the check valves are provided, the material in tank 25 is discharged from such tank approximately in the same order as that in which it was initially introduced into the tank. This is extremely important when the system is supplying a material like viscose which changes in properties with time. It is also important when handling materials in which the secondary substance tends to settle out if allowed to stand for too long a time. Such secondary materials as pigments and delustrants are particularly prone offenders.

While the accumulator system is connected to the header 18, it may be connected to the conduit 10 ahead of the mixing device 11. In this event, the tank level detecting means 33 would be connected only to the motor 16 so that the blender 11 would be operating at all times whether motor 16 is operating or not.

The system of the present invention as mentioned hereinabove is adapted for the production of products by extrusion into a coagulating medium which may be either of the lquid type as in wet spinning, of the dry type, such as a heated atmosphere for volatilizing a volatile solvent as in dry spinning, or a cooling atmosphere or medium as in fusion spinning.

It is to be understood that changes and variations may be made without departing from the spirit and scope of the invention as defined in the appended claims.

I claim:

1. Apparatus for producing shaped products comprising a plurality of forming stations, a main conduit for supplying a blend of spinning solution plus an additive to said stations, a pump for delivering the primary spinning solution to said conduit, a pump for delivering the additive material to said conduit, means for driving said pumps at predetermined speeds, a closed storage vessel for the blended spinning solution, a connecting conduit between spaced points on said storage vessel and the main conduit, uni-directional flow control means in said connecting conduit, and pressure responsive means on the storage vessel for controlling said pumps in accordance with the pressure in the vessel, said pressure responsive means functioning to stop the pumps when the pressure in the storage vessel exceeds a given value and to start the pumps when the pressure in the storage vessel drops below a given value.

2. Apparatus for producing shaped products comprising a plurality of forming stations, a main conduit for supplying a blend of spinning solution plus an additive to said stations, a pump for delivering the primary spinning solution to said conduit, a pump for delivering the additive material to said conduit, means for driving said pumps at predetermined speeds, a closed storage vessel for the blended spinning solution, a single conduit connected from said storage vessel to the main conduit between the pumps and the forming stations, a first branch conduit connecting said single conduit to the top of said storage vessel, a second branch conduit connecting said single conduit to the bottom of the storage vessel, a valve in each of said branch conduits, and pressure responsive means on the storage vessel for controlling said pumps in accordance with the pressure in the vessel, said pressure responsive means functioning to stop the pumps when the pressure in the storage vessel exceeds a given value and to start the pumps when the pressure in the storage vessel drops below a given value.

3. Apparatus in accordance with claim 2 having a blender in the main conduit between the storage vessel and the pumps, and means for driving said blender.

4. Apparatus in accordance with claim 2 having a check valve in the first branch conduit to permit flow of the blended spinning solution into the top of the vessel only, and having a check valve in the second branch conduit to permit flow out of the bottom of the vessel only.

References Cited in the file of this patent

UNITED STATES PATENTS 1,955,825    Palmer _____ Apr. 24, 1934